United States Patent
Seo (10) Patent No.: US 7,221,864 B2
(45) Date of Patent: May 22, 2007

(54) LIGHTING APPARATUS FOR PHOTOGRAPHING

(75) Inventor: Shuzo Seo, Saitama (JP)

(73) Assignee: PENTAX Corporation, Tokyo (JP)

( * ) Notice: Subject to any disclaimer, the term of this patent is extended or adjusted under 35 U.S.C. 154(b) by 103 days.

(21) Appl. No.: 10/956,076

(22) Filed: Oct. 4, 2004

(65) Prior Publication Data

US 2005/0074233 A1 Apr. 7, 2005

(30) Foreign Application Priority Data

Oct. 6, 2003 (JP) ............................ P2003-347320

(51) Int. Cl.
*G03B 15/03* (2006.01)
(52) U.S. Cl. .................... 396/176; 396/182; 348/371
(58) Field of Classification Search ............... 396/175, 396/176, 182, 199, 200; 348/370, 371; 362/11, 362/12, 338
See application file for complete search history.

(56) References Cited

U.S. PATENT DOCUMENTS 4,702,581 A * 10/1987 Yamada et al. ............. 396/176
5,895,128 A * 4/1999 Kishimoto et al. ........... 396/61
6,434,335 B1 * 8/2002 Terashima .................. 396/147
6,479,942 B2 * 11/2002 Kimura .................... 315/169.3
2003/0128542 A1 * 7/2003 Pohlert et al. .............. 362/253

FOREIGN PATENT DOCUMENTS

JP 2002-148686 5/2002

OTHER PUBLICATIONS

U.S. Appl. No. 10/938,506 to Kakiuchi et al., filed Sep. 13, 2004.

* cited by examiner

*Primary Examiner*—W. B. Perkey
*Assistant Examiner*—Rishi S. Suthar
(74) *Attorney, Agent, or Firm*—Greenblum & Bernstein, P.L.C.

(57) ABSTRACT

A lighting apparatus for lighting subjects to be photographed, includes a plurality of lighting units each having a lighting element and a radiating surface for radiating light from the lighting element, and each radiating surface having a normal line oriented in the same direction. Further, the lighting apparatus includes an optical-path deflection unit that has a plurality of optical-path deflectors for each of the lighting units, to deflect a direction and an illuminating angle of light emitted by each of the lighting elements. The optical-path deflectors are formed as one body. Therefore, the lighting apparatus has a simple structure, and uniformly illuminates the photographing area of the camera, by deflecting each optical path of light from the lighting units.

20 Claims, 6 Drawing Sheets

LIGHTING APPARATUS FOR PHOTOGRAPHING

BACKGROUND OF THE INVENTION

1. Field of the Invention

The present invention relates to a lighting apparatus for emitting light towards subjects to be photographed by silver-halide cameras, digital cameras, cellular phones, and so on with photographing functions.

2. Description of the Related Art

Recently, a smaller amount of light than before is required for illuminating objects with a lighting apparatus, because of improvements of sensitivity of silver salt films, color films, and charge coupled devices. Therefore, even though the amount of light output by light emitting diodes (LEDs) is smaller than that output by conventional xenon tubes, usage of LEDs as lighting apparatus for photographing is proposed for improved lighting efficiency, reduced power consumption, and increased life.

However, because a single LED can not emit enough light for photographing, an apparatus including a plurality of LEDs as light sources, is proposed.

In the case where a plurality of LEDs, each having narrow illuminating angle is used for a lighting apparatus, the LEDs are arranged to emit light in different directions for uniformly illuminating the entire photographing area of the camera. Therefore, the lighting apparatus has a complex structure. In addition to this, problems with the lighting apparatus, or with handling of the apparatus, can occur because of the concentrated heat produced due to emitting light from a plurality of LEDs arranged close to each other.

Further, it is difficult to control the light emitting direction of LEDs, because a radiating surface of an LED body is generally covered by a lucent resin layer functioning as a protector of the LED body and lens.

SUMMARY OF THE INVENTION

Therefore, an object of the present invention is to provide a lighting apparatus using LEDs and having a simple structure, that can illuminate an entire photographing area of a camera uniformly, and that can prevent overheating while emitting light.

A lighting apparatus for lighting subjects to be photographed according to the present invention, includes a plurality of lighting units each having a lighting element and a radiating surface, for radiating light from the lighting element, and each of the radiating surfaces having a normal line oriented in the same direction. Further, it includes an optical-path deflection unit that has a plurality of optical-path deflectors for each of the lighting units to deflect a direction and an illuminating angle of light emitted by each of the lighting elements. The plurality of optical-path deflectors are formed as one body.

In the lighting apparatus, the radiating surfaces may be substantially aligned on one plane, and the lighting units can be arranged to form a shape which is similar to the shape of the photographing area of a photographing device that is used with the lighting apparatus.

Light from the lighting units may be uniformly diffused over the photographing area by optical-path deflection of the optical-path deflection unit. In this case, a first lighting unit located in the center of all the lighting units, may emit light in a parallel direction to an optical axis of a photographing optical system of the photographing device, and a second lighting unit may emit light in a different direction having a different angle to the optical axis and departing from the optical axis, and when a distance between the first lighting unit and the second lighting unit is larger, the optical-path deflector for the second lighting unit may deflect the different angle to increase.

In the lighting apparatus, each of the optical-path deflectors may include a plurality of lenses for deflecting the optical path of light emitted by each of the lighting units. In this case, a first lens for the first lighting unit may be arranged so that a first optical axis of the first lens is substantially the same as a first normal line extending from the center of the radiating surface of the first lighting unit. A second lens for the second lighting unit, may be arranged so that a distance between a second optical axis of the second lens and a second normal line extending from the center of the radiating surface of the second lighting unit increases, when a distance between the first lighting unit and the second lighting unit is greater, and so that the second normal line is between the first optical axis and the second optical axis.

The lighting apparatus can further include a holding unit in which the plurality of lighting units and the optical-path deflection unit are attached, and the plurality of lighting units and the plurality of optical-path deflectors may be held at predetermined relational positions. The holding unit can be made of metal.

In the lighting apparatus, each of the lighting elements may include a light emitting diode (LED).

BRIEF DESCRIPTION OF THE DRAWINGS

The present invention will be better understood from the description of the preferred embodiment of the invention set forth below together with the accompanying drawings, in which.

DESCRIPTION OF THE PREFERRED EMBODIMENTS

Hereinafter, the preferred embodiment of the present invention is described with reference to the attached drawings.

Figure 1:
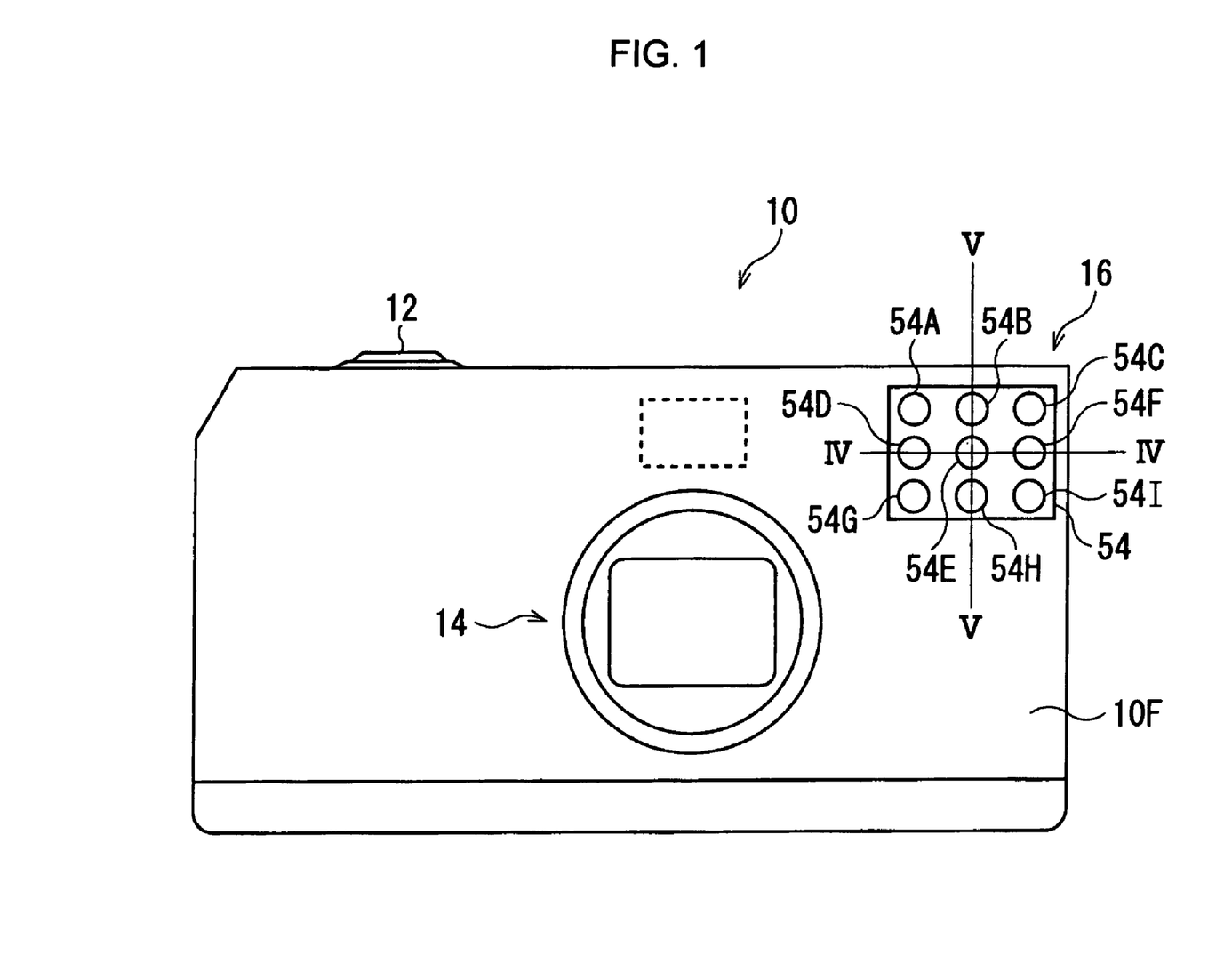
FIG. 1 is a front view of a digital camera of an embodiment of the present invention.

FIG. 1 is a front view of a digital camera of an embodiment of the present invention.

A digital camera 10 has a release button 12, a photographing optical system 14, and a lighting apparatus 16. The lighting apparatus 16 includes first to ninth lighting units 16A–I (not shown) and an integrated lens 54, which is arranged along the front surface 10F of the digital camera 10 and deflects optical-paths of light emitted by each of the first to ninth lighting units 16A–I. The integrated lens 54 has the first to ninth optical-path deflectors (lenses) 54A–I formed as one body, and each deflects a direction and an illuminating angle of the light emitted by each of the corresponding lighting units 16A–I.

The first to ninth lighting units 16A–I are buried in the front surface 10F of the digital camera 10, and correspond to the first to ninth optical-path deflectors 54A–I, (the first lighting unit 16A is set so as to neighbor the first optical-path deflector 54A and this relationship holds for the other lighting units) collaborate with the integrated lens 54 to uniformly illuminate the photographing area of the digital camera 10. That is, the first to ninth lighting units 16A–I are buried in the front surface 10F of the digital camera 10 in a matrix manner, 3 rows and 3 columns, corresponding to the shape of the photographing area of the digital camera 10. Here, the ratio of width in the horizontal direction (parallel to the line IV—IV) to length in the vertical direction (parallel to the line V—V) of the lighting units 16A–I is 4:3, the same as the aspect ratio of photographing area of the digital camera 10. Therefore, the distance in the horizontal direction is slightly longer than that in the vertical direction.

Figure 2:
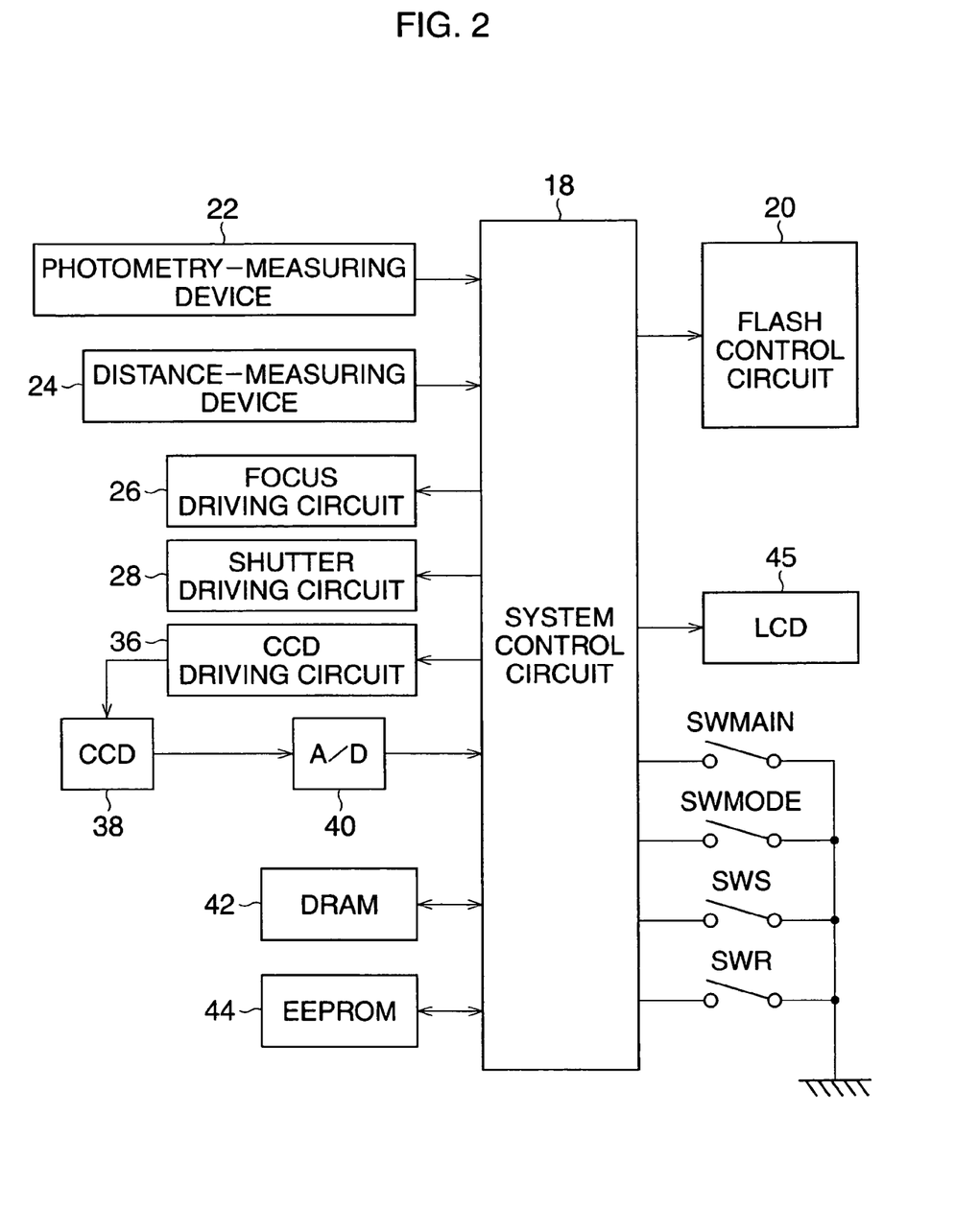
FIG. 2 is a block diagram of a digital camera.

FIG. 2 is a block diagram of the digital camera 10.

The system control circuit 18 controls the whole digital camera 10, and a main switch SWMAIN and a mode setting switch SWMODE are connected to the system control circuit 18. The main switch SWMAIN is for starting the digital camera, then, when the main switch SWMAIN is turned on by a user, the system control circuit 18 starts. The mode setting switch SWMODE is a dial on the surface of the digital camera 10 (not shown). By setting the dial to the predetermined rotating position, signals corresponding to the photographing mode, exposure setting mode, play-back mode, and so on are sent to the system control circuit 18. As a result, a mode selected by a user is set. In an EEPROM 44, various data for processing signals by the system control circuit 18 are previously memorized.

A photometry-measuring switch SWS connected to the system control circuit 18 turns on when the release button 12 is half depressed. When the photographing mode is set and the photometry-measuring switch SWS turns on, photometry data of a subject to be photographed is measured by a photometry-measuring device 22, and an object distance is measured by a distance-measuring device 24, respectively. The obtained photometry and distance data are transmitted to the system control circuit 18.

When a distance is measured by the distance-measuring device 24, auto-focusing according to the distance is carried out by a focus driving circuit 26. That is, a photographing lens is driven by the necessary amount for adjusting the focus by the focus driving circuit 26, based on the control signal output by the system control circuit 18.

In addition to the auto focusing, in the case where the photometry data of the object measured by the photometry-measuring device 22 is smaller than the predetermined value, it is judged that illuminating the object according to the photometry of the object and the object distance is required, by the system control circuit 18. As a result, a flash control circuit 20 controls the lighting apparatus 16 to illuminate the object when a shutter (not shown) is opened, as mentioned below, based on the control signal from the system control circuit 18.

A release switch SWR is turned on when the release button 12 is fully pressed. When the release switch SWR is turned on, a shutter is opened to adjust exposure by a predetermined aperture for a predetermined time, by the shutter driving circuit 28, based on the control signal from system control circuit 18. And then the CCD 38 controlled by a CCD driving circuit 36 is exposed, so that image signals according to the image are produced in the CCD 38. The image signals are successively read from the CCD 38, and transmitted to an amplifier circuit (not shown).

After the image signals read from the CCD 38 are amplified by the amplifier circuit, the analog image signals are transformed to the digital image signals in an A/D transforming circuit 40. The digital image signals are processed, for example being gamma corrections, and white balance adjustments are carried out, and then the processed signals are transmitted to the system control circuit 18. Further, signals are sent to an LCD driver (not shown) from the system control circuit 18, an LCD 45 is driven, and the subject image is displayed on the LCD 45. The image data of the photographed subjects are memorized in the DRAM 42 or a memory card (not shown).

Figure 3:
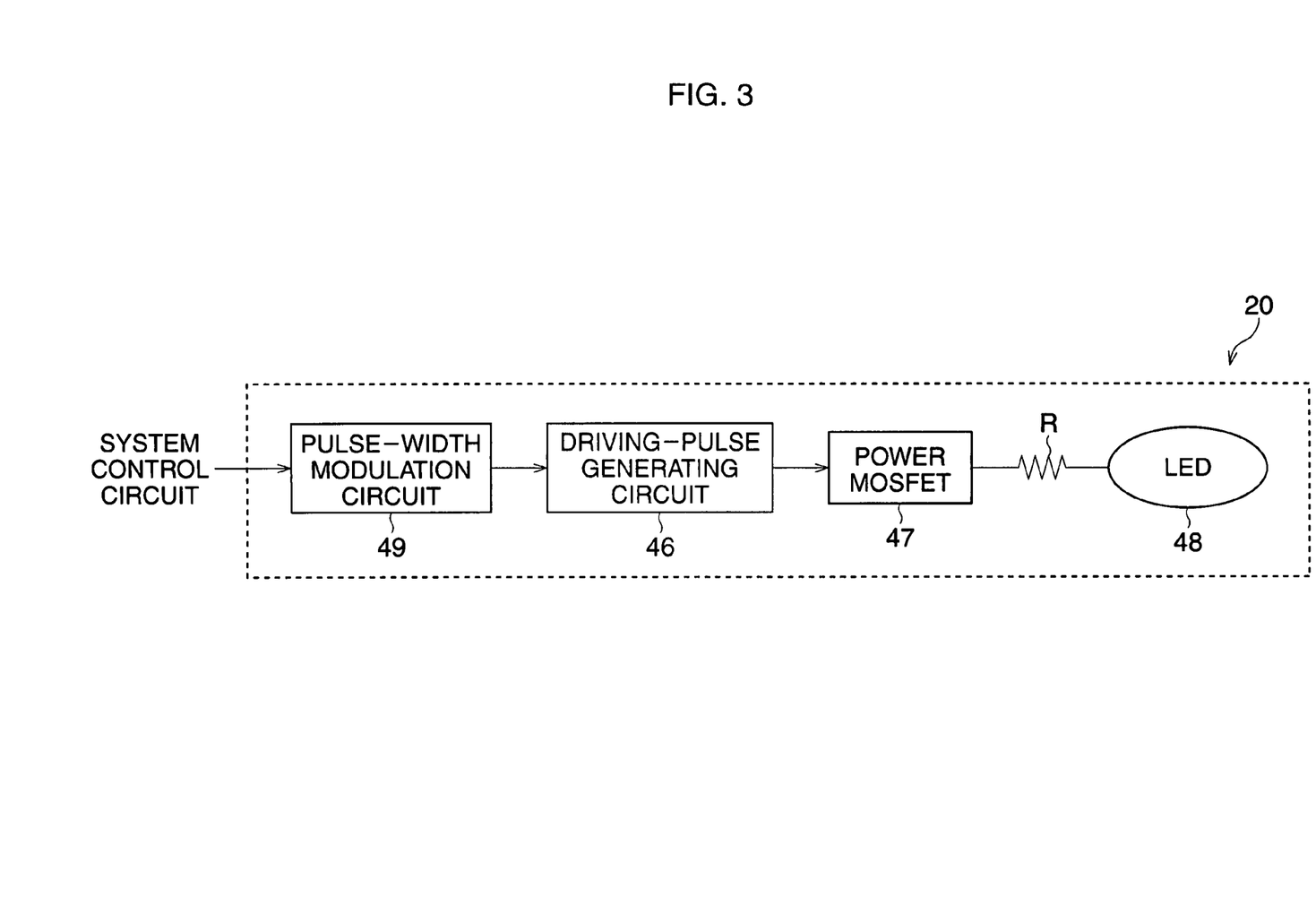
FIG. 3 is a conceptual view of a flash control circuit.

FIG. 3 is a conceptual view of the flash control circuit 20.

The flash control circuit 20 includes a pulse-width modulation circuit 49, a driving-pulse generating circuit 46, a power MOSFET 47, and LEDs 48. Control signals for controlling the emission of the LEDs 48 are input in the pulse-width modulation circuit 49 from the system control circuit 18. In the pulse-width modulation circuit 49, pulse signals having a desired duty ratio, predetermined pulse width, and frequency are generated. These pulse signals are sent to the driving-pulse generating circuit 46. The driving-pulse generating circuit 46 modulates the voltage and current of the pulse to be suitable values for driving the LEDs 48, and outputs them as driving signals. The driving signals output from the driving-pulse generating circuit 46, are transmitted to the LEDs 48 via the power MOSFET 47 and resistance R. The LEDs 48 are driven by the driving signals and emit light.

Figure 4:
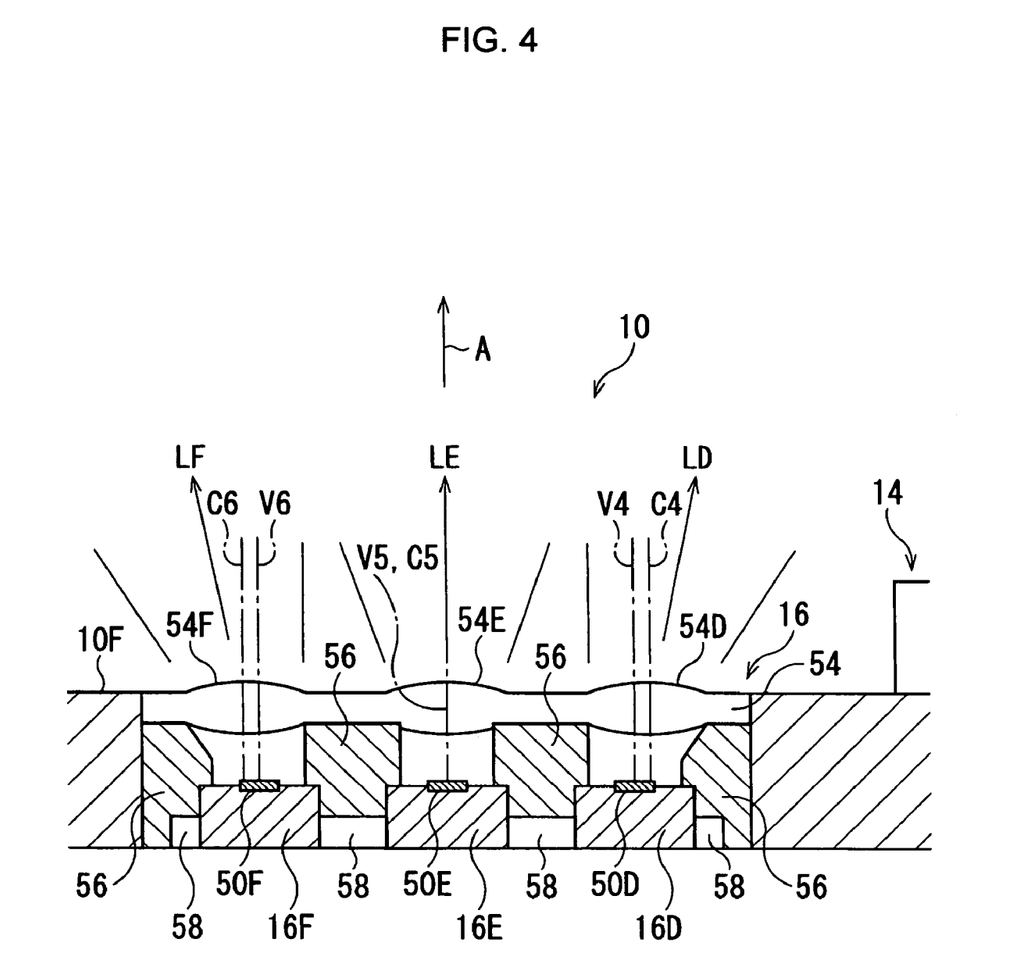
FIG. 4 is a sectional view of the lighting apparatus along the line IV—IV of FIG. 1.

FIG. 4 is a sectional view of the lighting apparatus 16 along the line IV—IV of FIG. 1.

Each of the lighting units 16A–I (including the first to third lighting units 16A–C and the seventh to ninth lighting units 16G–I not shown) has an LED (not shown), and each of the radiating surfaces 50A–I (including the first to third radiating surfaces 50A–C and the seventh to the ninth radiating surfaces 50G–I not shown). All radiating surfaces 50A–I are parallel to each other and are substantially aligned on the same plane, and normal lines V1 to V9 extending from the center of the radiating surfaces 50A–I, are parallel to the optical axis of the photographing optical system 14.

The integrated lens 54 along the front surface 10F of the digital camera 10, is arranged in front of the lighting units 16A–I. Between the integrated lens 54 and the lighting units 16A–I, a holder 56 is arranged. The holder 56 holds the integrated lens 54 and the lighting units 16A–I in predetermined relational positions. The holder 56 is made of metal mainly containing aluminum, therefore, the holder 56 promptly absorbs heat generated by light emission of the lighting units 16A–I, and diffuses it to a metal plate (not shown) on which the lighting units 16A–I are attached so that the lighting apparatus 16 can prevent generating a high temperature due to heat concentration. For this purpose, the holder 56 is preferably made of a metal having high heat conductivity such as aluminum, copper and so forth. In the lighting apparatus 16, there are apertures 58 besides the lighting units 16A–I and the holder 56, for taking in solder used for attaching the lighting units 16A–I to the metal plate.

The integrated lens 54 includes the first to ninth optical-path deflectors 54A–I (including the first to third optical-path deflectors 54A–C and the seventh to the ninth optical-path deflectors 54G–I not shown) formed as one body, and each of the optical-path deflectors 54A–I is arranged in the corresponding position to each of the lighting units 16A–I for deflecting the optical-path of light emitted by each of the lighting units 16A–I. That is, the optical paths of light emitted from the fourth to sixth radiating surfaces 50D–F, are deflected by the fourth to the sixth optical-path deflectors 54D–F respectively. And then, the focal distances of the first to ninth optical-path deflectors 54A–I to corresponding lighting units 16A–I are kept constant by the holder 56.

The light LE from the fifth lighting unit 16E located in the center of all the lighting units 16A–I, is deflected to be emitted in a parallel direction to the optical axis of the photographing optical system 14 indicated by the arrow A. The light LD from the fourth lighting unit 16D located at the right side of the fifth lighting unit 16E in FIG. 4, is deflected to be emitted in the right direction of the optical axis of the photographing optical system 14. On the other hand, the light LF from the sixth lighting unit 16F located in the left side of the fifth lighting unit 16E, is deflected to be emitted in the left direction of the optical axis of the photographing optical system 14. The light from LD to LF is emitted at predetermined illuminating angles.

Here, although the normal line V5 extending from the center of the fifth radiating surface 50E, is coincident with the optical axis C5 of the fifth optical-path deflector 54E which is parallel to the optical axis of the optical system 14, the normal lines V4 and V6 extending from the center of the fourth and sixth radiating surfaces 50D and 50F are not coincident with the respective optical axes C4 and C6 of the fourth and sixth optical-path deflectors 54D and 54F. The optical axis C4 is at a different side of the optical axis C5 beyond the normal line V4, and the optical axis C6 is at a different side of the optical axis C5, beyond the normal line V6 as well. Arranging the integrated lens 54 this way, enables the optical path of light from the fifth radiating surface 50E to be deflected and emitted in a parallel direction to the optical axis of the optical system 14, and the optical paths of light from the fourth and sixth radiating surfaces 50D and 50F are deflected by the fourth and the sixth optical-path deflectors 54D and 54F, to be emitted in different directions having different angles to the optical axis C5 of the fifth radiating surface 50E running through the center of the lighting apparatus 16, and departing from the optical axis C5.

Note that the distance between the optical axis C4 and the normal line V4 of the fourth radiating surface 50D equals the distance between the optical axis C6 and the normal line V6. Further, the optical axis C4 and C6 are symmetrical about the optical axis C5.

As mentioned above, because all of the radiating surfaces 50A–I are arranged to face the same direction, and all of the optical-path deflectors 54A–I of the integrated lens 54 are formed as one body, the structure of the lighting apparatus 16 can be simpler than a lighting apparatus that has a plurality of lighting units arranged to face different directions for emitting light in different directions, and that has independent optical-path deflectors for all of the lighting units.

Figure 5:
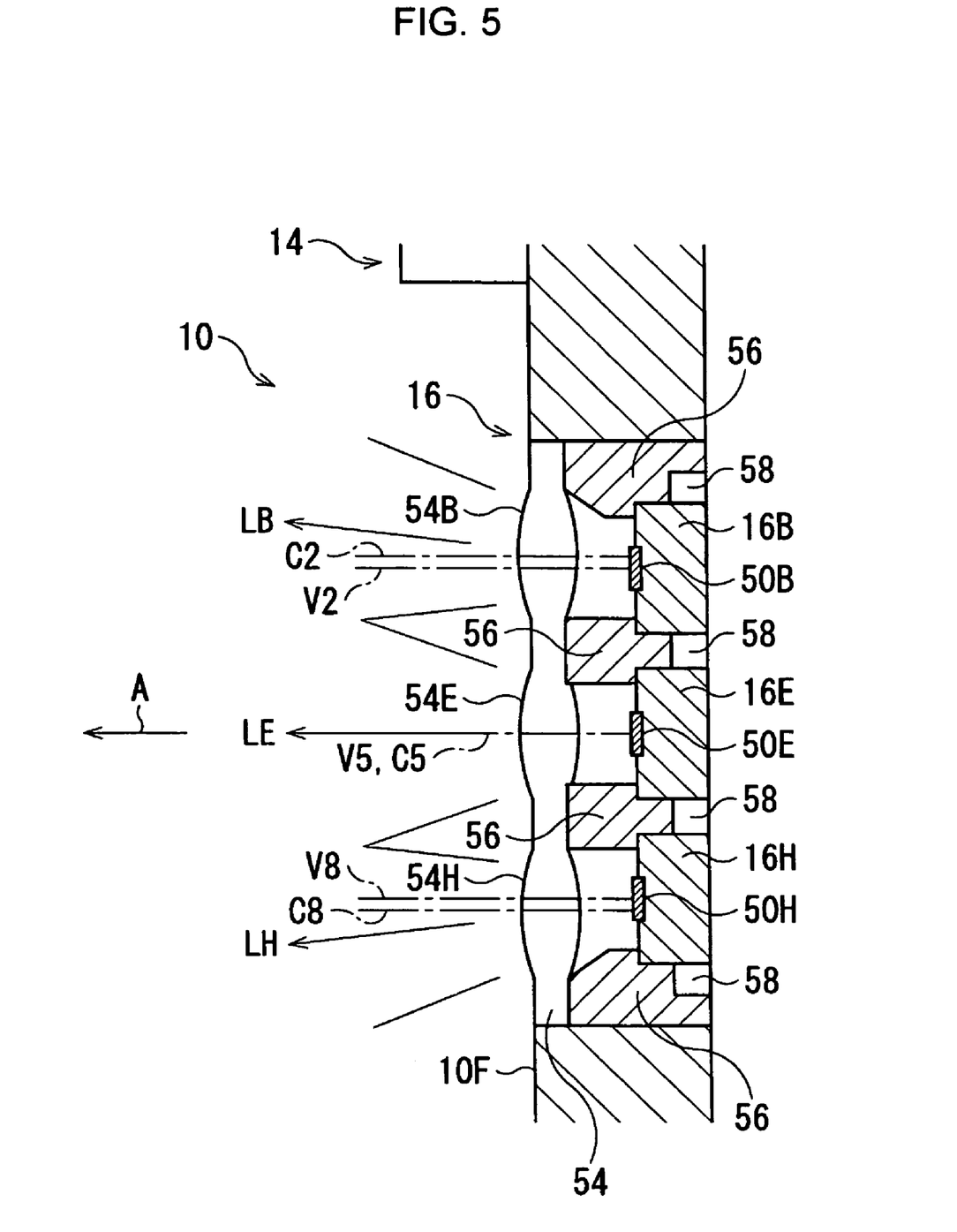
FIG. 5 is a sectional view of the lighting apparatus along the line V—V of FIG. 1.

FIG. 5 is a sectional view of the lighting apparatus 16 along the line V—V of FIG. 1.

The optical-path of light LB from the second lighting unit 16B arranged above the fifth lighting unit 16E, is deflected to be emitted in an upper direction to the optical axis of the optical system 14 indicated by the arrow A, by the second optical-path deflector 54B. On the other hand, the optical-path of light LH from the eighth lighting unit 16H arranged below the fifth lighting unit 16E, is deflected to be emitted in a lower direction to the optical axis of the optical system 14, by the eighth optical-path deflector 54H. The light from LB to LH is emitted at predetermined illuminating angles.

Here, although the normal line V5 extending from the center of the fifth radiating surface 50E, is coincident with the optical axis C5, the normal lines V2 and V8 extending from the center of the second and eighth radiating surfaces 50B and 50H are not coincident with the respective optical axis C2 and C8 of the second and eighth optical-path deflectors 54B and 54H, and the optical axis C2 is at a different side of the optical axis C5 beyond the normal line V2, and the optical axis C8 is at a different side of the optical axis C5 beyond the normal line V8 as well. This is because the optical paths of light from the second and eighth radiating surfaces 50B and 50H are deflected by the second and eighth optical-path deflectors 54B and 54H, to be emitted in different directions having different angles to the optical axis C5, and departing from the optical axis C5.

Note that the distance between the optical axis C2 and the normal line V2 equals the distance between the optical axis C8 and the normal line V8. Further, the optical axis C2 and C8 are in the symmetry about the optical axis C5.

In the lighting apparatus 16, each of the lighting units 16A–I arranged in a matrix manner, emits light towards a part of the photographing area of the digital camera 10 according to the arrangement of the lighting unit, to uniformly illuminate the entire photographing area. That is, the light LE from the fifth radiating surface 50E in the center of all the radiating surfaces 50A–I, is deflected to be emitted in a parallel direction to the optical axis of the photographing optical system 14, and light from the other radiating surfaces is deflected to be emitted in a different direction having a different angle to the optical axis of the photographing optical system 14 and to depart from the optical axis. And then, when the fifth radiating surface 50E is further from the other radiating surface, light from the other radiating surface is deflected to have wider different angle by the integrated lens 54. Therefore, light from all the lighting units 16A–I is uniformly diffused over the photographing area, and then the lighting apparatus 16 uniformly illuminates the entire photographing area.

The distance between the fifth lighting unit 16E located in the center of the lighting apparatus 16 and the second lighting unit 16B or the eighth lighting unit 16H is shorter than the distance between the fifth lighting unit 16E and the fourth lighting unit 16D or the sixth lighting unit 16F, because the distance ratio of the horizontal direction (parallel to the line IV—IV) to the vertical direction (parallel to the line V—V) of the neighboring lighting units is 4:3 (see FIG. 1), as mentioned above. Therefore, the light from the second and the eighth radiating surfaces 50B and 50H is deflected to be emitted in a closer direction to the optical path of the photographing optical system 14 than the light from the fourth and sixth radiating surfaces 50D and 50F. And then, the distances between the optical axis C2 and the normal line V2, and the optical axis C8 and the normal line VB are shorter than the distances between the optical axis C4 and the normal line V4, and the optical axis C6 and the normal line V6 (see FIG. 4 and FIG. 5).

Therefore, light LA, LC, LG, and LI (not shown) from the first, third, seventh, and ninth radiating surfaces 50A, 50C, 50G, and 50I (not shown), which are the farthest radiating surfaces from the fifth radiating surface 50E, is respectively deflected to be emitted in the upper right, upper left, lower right, and lower left directions from the user. Light is radiated at a larger different angle to the optical axis C5 than the different angles of the light LD and LF.

In the state where the integrated lens 54 is held by the holder 56, the optical-path deflectors 54A–I are configured so that the optical axis C5 is coincident with the normal line V5, and the other optical axes of the optical-path deflectors being located of further distances from the fifth optical-path deflector 54E, are further away from and outside of the optical axis C5 of the fifth optical-path deflectors 54E.

In addition to the above-mentioned light LB, LD–LF, and LH, also light LA, LC, LG, and LI is emitted at predetermined illuminating angles. All light from LA to LI is emitted at different illuminating angles. The light LE from the fifth lighting unit 16E located at the center of the lighting apparatus 16 is deflected to be emitted in a parallel direction to the optical axis of the photographing optical system 14. The light from the other lighting units is deflected to be emitted in different directions having different angles to the optical axis and departing from the optical axis, and is deflected to have different angles according to the distance from the fifth lighting unit 16E, so that the lighting apparatus 16 uniformly illuminates subjects to be photographed.

Figure 6:
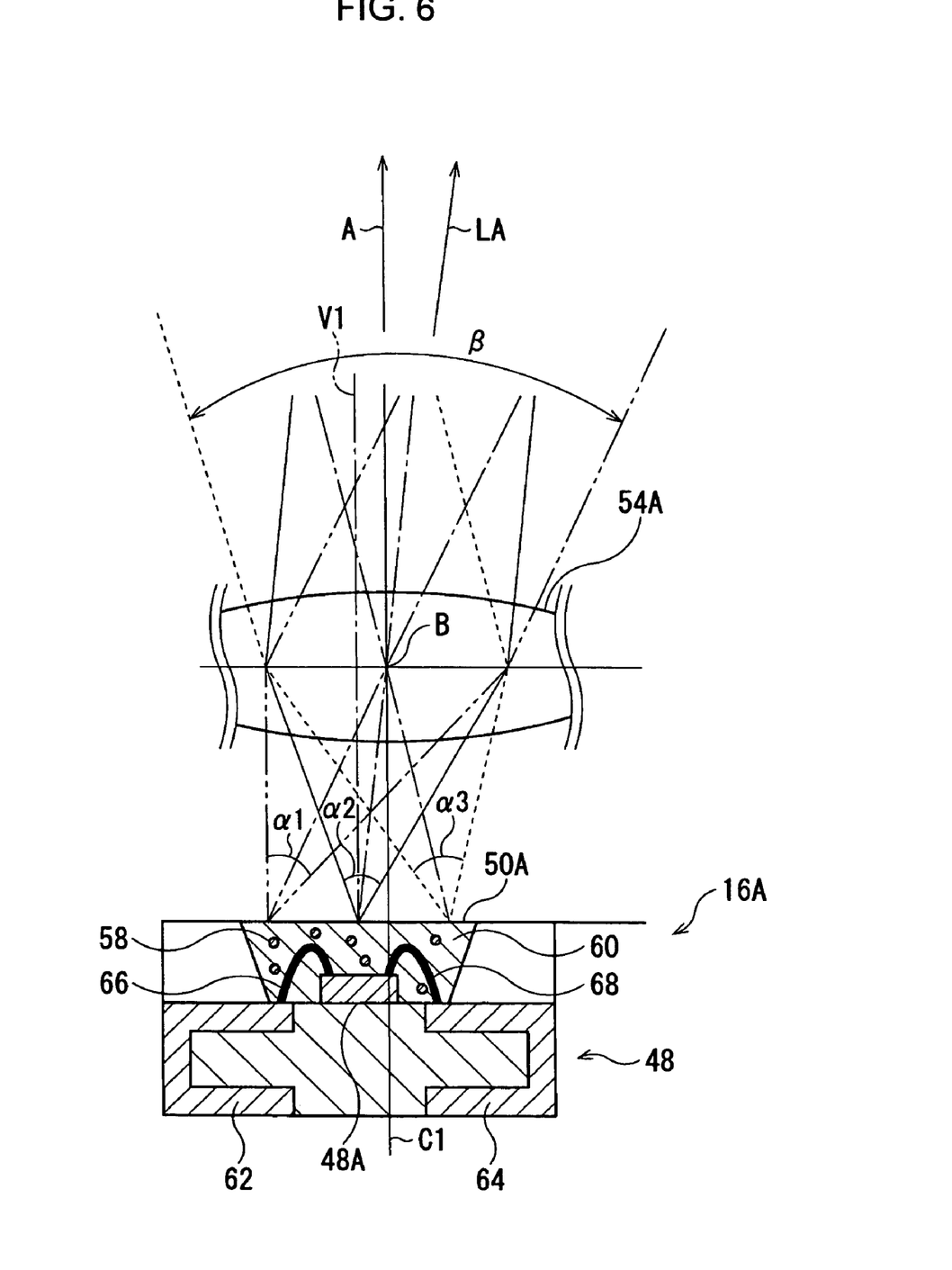
FIG. 6 is a sectional view of a lighting unit.

FIG. 6 is a sectional view of the first lighting unit 16A.

The first lighting unit 16A includes the LED 48 as a light source. The LED 48 has a lighting section 48A which emits blue light, and first and second leads 66 and 68. The lighting section 48A is connected to a cathode terminal 62 via the first lead 66, and is also connected to an anode terminal 64 via the second lead 68. The cathode terminal 62 provides current to the lighting section 48A for emitting light, and the amount of emitting light is adjusted by altering the amount of current provided. Between the lighting section 48A and the first radiating surface 50A, a lighting layer 60, including fluophors 59 which absorb the blue light from the lighting section 48A and change it into white light, is provided. Note that all other lighting units 16B–I have the same structure as the first lighting unit 16A.

Light from the first lighting unit 16A is not radiated from a special point on the first radiating surface 50A, but from the entire first radiating surface 50A uniformly and non-directionally, because it is white light of secondary emission reflected by many fluophors 59 distributed uniformly inside the lighting layer 60. Here, only the light from the center and the two edge points of the first radiating surface 50A is shown. When the white light having illuminating angles $\alpha_{1-3}$ enters the first optical-path deflector 54A, it is refracted in and passed through the first optical-path deflector 54A, and emitted as parallel light as shown in FIG. 6. Here, the light from a special point on the first radiating surface 50A is emitted as parallel light after passing through the first radiating surface 50A, the light LA from the entire first radiating surface 50A has illuminating angle $\beta$.

Although the first to ninth lighting units 16 A–I are buried in the digital camera 10 as one body in the embodiment, the lighting apparatus can be independent to the digital camera 10.

The emitting direction and illuminating angle of the light emitted by the lighting apparatus 10 can be modified by the shapes of the optical-path deflectors 54A–I, the configuration of the lighting layer 60, and so forth.

The arrangement of the lighting units 16A–I in the lighting apparatus 16 is not limited to that in the embodiment. For example, two lighting units arranged horizontally along the front surface 10F of the digital camera 10, six lighting units arranged in a matrix manner of 2 rows in the horizontal direction and 3 columns in the vertical direction along the front surface 10F, and twelve lighting units arranged in a matrix manner of 3 rows and 4 columns, can be used. In these cases, the shapes of the integrated lens 54 and the holder 56 and so on, are modified to accommodate the arrangement of the lighting units.

The lighting apparatus 16 can be used not only with the digital camera 10, but also standard film cameras, cellular phones with photographing functions, and so on. And the lighting apparatus 16 can be detachably attached to the camera body, differing from forming one body as shown in the embodiment.

The lighting mechanism is not limited to that of the lighting unit 16A–I, the lighting section 48A–I emitting blue light, and the fluophors 59 for reflecting white light as the secondary emission, in the embodiment. For example, emitting white light by using LEDs having a lighting section emitting red, or green light, can be carried out.

As mentioned above, the invention enables a lighting apparatus in which the lighting units are arranged so that each normal line of the radiating surfaces is oriented in the same direction, an integrated lens covers all the lighting units along a surface of the camera, and the structure is simple. And then, a lighting apparatus uniformly illuminates a photographing area of the camera, by deflecting each optical path of the light from the lighting units. Further, a lighting apparatus includes a holder for preventing heat concentration, and holding the lighting units and optical-path deflectors at predetermined relational positions.

Finally, it will be understood by those skilled in the art that the foregoing description is of a preferred embodiment of the apparatus, and that various changes and modifications may be made to the present invention without departing from the spirit and scope thereof.

The present disclosure relates to subject matters contained in Japanese Patent Application No. 2003-347320 (filed on Oct. 6, 2003) which is expressly incorporated herein, by reference, in its entirety.

The invention claimed is:

1. A lighting apparatus for lighting subjects to be photographed, comprising:

a plurality of lighting units each having a lighting element and a radiating surface, for radiating light from said lighting element, and each said radiating surface having a normal axis oriented in the same direction; and an optical-path deflection unit that has a plurality of optical-path deflectors for each of said lighting units, to deflect a direction and an illuminating angle of light emitted by each of said lighting elements, and that is formed as one body, wherein said lighting units are arranged to form a shape which corresponds to a shape of a photographing area of a photographing device that is used with said lighting apparatus, wherein light from said lighting units is uniformly diffused over said photographing area using optical-path deflection by said optical-path deflection unit, and wherein light from a first lighting unit located at the center of said plurality of lighting units is deflected to be emitted in a direction parallel to an optical axis of a photographing optical system of said photographing device, and light from a second lighting unit is deflected to be emitted in a direction deviating from said optical axis, and a magnitude of an angle of deflection by said optical-path deflector for said second lighting unit is determined in accordance and has a positive correlation with a distance between said first lighting unit and said second lighting unit.

2. The lighting apparatus according to claim 1, wherein said radiating surfaces are substantially aligned on one plane.

3. The lighting apparatus according to claim 1, further comprising:

a holding unit in which said plurality of lighting units and said optical-path deflection unit are attached, wherein said plurality of lighting units and said plurality of optical-path deflectors are held at predetermined relational positions.

4. The lighting apparatus according to claim 3, wherein said holding unit comprises a metal.

5. The lighting apparatus according to claim 1, wherein each said lighting element includes a light emitting diode (LED).

6. A lighting apparatus for lighting subjects to be photographed, comprising:
a plurality of lighting units each having a lighting element and a radiating surface, for radiating light from said lighting element, and each said radiating surface having a normal axis oriented in the same direction; and
an optical-path deflection unit that has a plurality of optical-path deflectors for each of said lighting units, to deflect a direction and an illuminating angle of light emitted by each of said lighting elements, and that is formed as one body,
wherein said lighting units are arranged to form a shape which corresponds to a shape of a photographing area of a photographing device that is used with said lighting apparatus,
wherein each said optical-path deflector includes a plurality of lenses for deflecting the optical path of light emitted by each said lighting unit, a first lens for said first lighting unit is arranged so that a first optical axis of said first lens is substantially the same as a first normal axis extending from the center of said radiating surface of said first lighting unit, and a second lens for said second lighting unit is arranged so that a magnitude of an angle of deflection between a second optical path of said second lens and a second normal axis extending from the center of said radiating surface of said second lighting unit is determined in accordance and has a positive correlation with a distance between said first lighting unit and said second lighting unit, such that said second normal axis is between said first optical axis and said second optical axis.

7. The lighting apparatus according to claim 6, wherein said radiating surfaces are substantially aligned on one plane.

8. The lighting apparatus according to claim 6, further comprising:
a holding unit in which said plurality of lighting units and said optical-path deflection unit are attached,
wherein said plurality of lighting units and said plurality of optical-path deflectors are held at predetermined relational positions.

9. The lighting apparatus according to claim 8, wherein said holding unit comprises a metal.

10. The lighting apparatus according to claim 6, wherein each said lighting element includes a light emitting diode (LED).

11. A lighting apparatus for lighting subjects to be photographed, comprising:
a plurality of lighting units each having a lighting element and a radiating surface, for radiating light from said lighting element, and each said radiating surface having a normal axis oriented in the same direction; and
an optical-path deflection unit that has a plurality of optical-path deflectors for each of said lighting units, to deflect a direction and an illuminating angle of light emitted by each of said lighting elements, and that is formed as one body,
wherein said lighting units are arranged to form a shape which corresponds to a shape of a photographing area of a photographing device that is used with said lighting apparatus, and
wherein light from a first lighting unit located at the center of said plurality of lighting units is deflected to be emitted in a direction parallel to an optical axis of a photographing optical system of said photographing device, and light from a second lighting unit is deflected to be emitted in a direction deviating from said optical axis.

12. The lighting apparatus according to claim 11, wherein said radiating surfaces are substantially aligned on one plane.

13. The lighting apparatus according to claim 11, further comprising:
a holding unit in which said plurality of lighting units and said optical-path deflection unit are attached,
wherein said plurality of lighting units and said plurality of optical-path deflectors are held at predetermined relational positions.

14. The lighting apparatus according to claim 13, wherein said holding unit comprises a metal.

15. The lighting apparatus according to claim 11, wherein each said lighting element includes a light emitting diode (LED).

16. A lighting apparatus for lighting subjects to be photographed, comprising:
a plurality of lighting units each having a lighting element and a radiating surface, for radiating light from said lighting element, and each said radiating surface having a normal axis oriented in the same direction; and
an optical-path deflection unit that has a plurality of optical-path deflectors for each of said lighting units, to deflect a direction and an illuminating angle of light emitted by each of said lighting elements, and that is formed as one body,
wherein said lighting units are arranged to form a shape which corresponds to a shape of a photographing area of a photographing device that is used with said lighting apparatus, and
wherein a magnitude of an angle of deflection by said optical-path deflector for a second lighting unit is determined in accordance and has a positive correlation with a distance between said second lighting unit and a first lighting unit located at the center of said plurality of lighting units.

17. The lighting apparatus according to claim 16, wherein said radiating surfaces are substantially aligned on one plane.

18. The lighting apparatus according to claim 16, further comprising:
a holding unit in which said plurality of lighting units and said optical-path deflection unit are attached,
wherein said plurality of lighting units and said plurality of optical-path deflectors are held at predetermined relational positions.

19. The lighting apparatus according to claim 18, wherein said holding unit comprises a metal.

20. The lighting apparatus according to claim 16, wherein each said lighting element includes a light emitting diode (LED).

* * * * *